Aug. 25, 1931.   J. W. STRICKLAND   1,820,635
TRAY
Filed Aug. 23, 1929
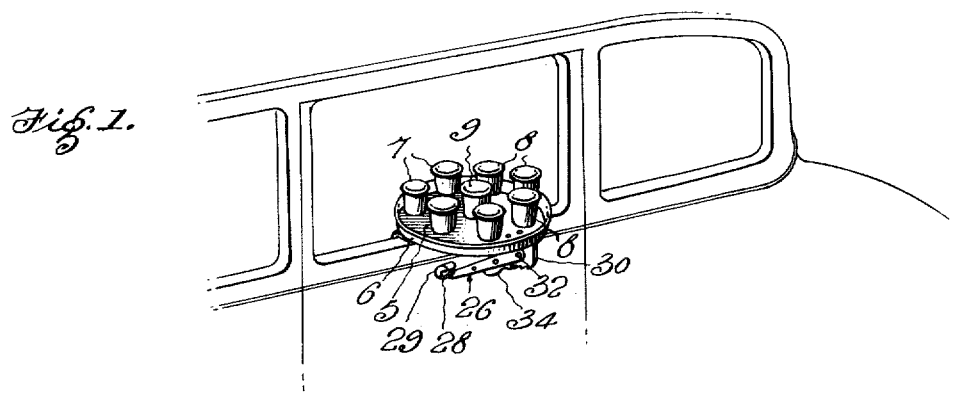
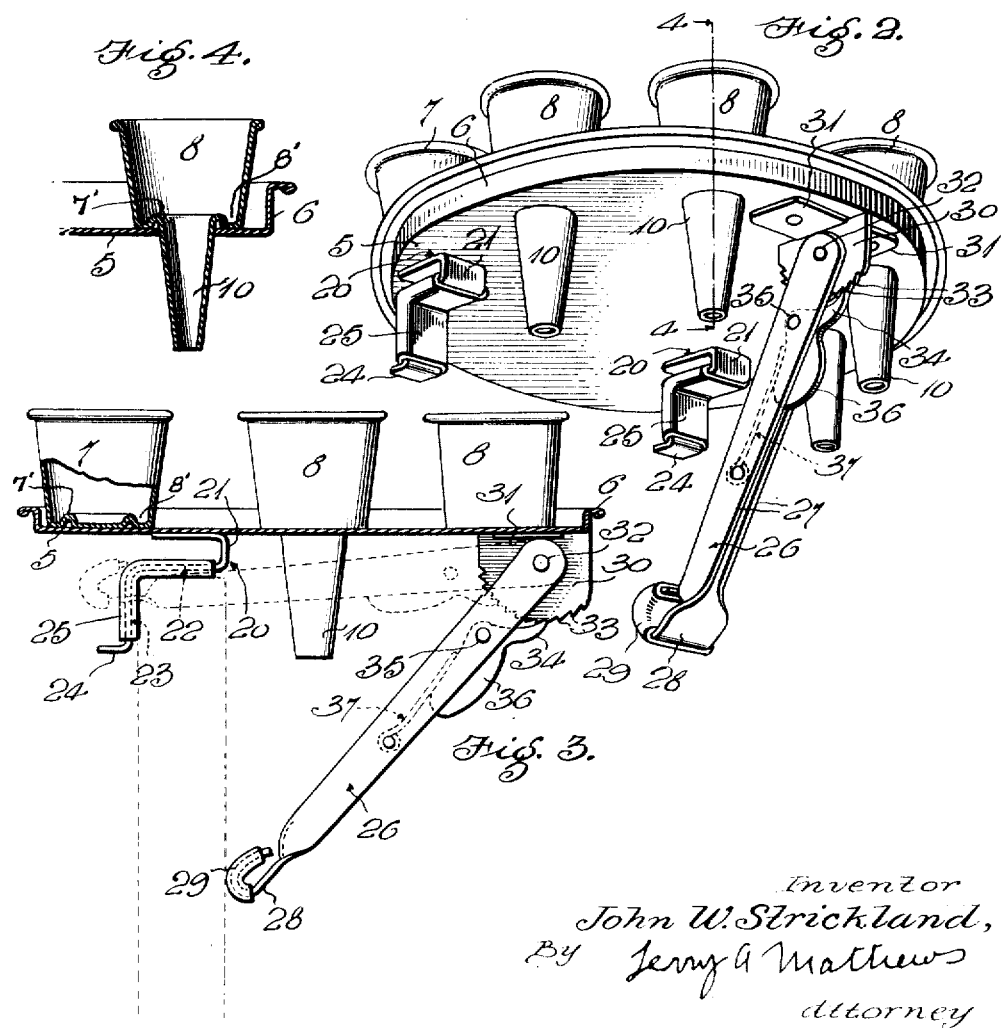
Inventor
John W. Strickland,
By Jerry G. Mathews
Attorney Patented Aug. 25, 1931

1,820,635

UNITED STATES PATENT OFFICE

JOHN W. STRICKLAND, OF NASHVILLE, NORTH CAROLINA

TRAY

Application filed August 23, 1929. Serial No. 387,995.

My invention relates to improvements in trays to be detachably mounted upon an automobile or the like.

As is well known, drug stores, ice cream parlors and the like, have what is known as "curb service". The waiter brings the ice cream or soft drinks to the automobile at the curb. My invention provides a tray adapted for use in this "curb service". The tray is so constructed that it may be quickly and conveniently mounted upon the door or window of the automobile, and will remain securely in place without liability of injury to the automobile. When the brace arm of the tray is folded to the inner position, the tray may be arranged upon a table or the like. The tray is of simple construction, easy to clean and maintain in a sanitary condition. The tray also preferably carries cups or receptacles for holding glasses and also for holding ice cream cones, and soda water or the like may be drawn into the glasses without the operator touching the glasses with his hand, as the tray may be turned or shifted to bring the glasses to the desired positions to receive the syrup, carbonated water or the like. I also contemplate using the tray without the cups or holders. The tray may be in any suitable shape or size.

In the accompanying drawings, forming a part of this specification, and in which like numerals are employed to designate like parts throughout the same, Figure 1 is a perspective view of the tray, showing the same applied to an automobile door, Figure 2 is a similar view of the tray removed, Figure 3 is a central vertical section through the tray, Figure 4 is a detailed section through one of the combined glass holders and ice cream cone holders, taken on line 4—4 of Figure 3.

In the drawings, wherein for the purpose of illustration is shown a preferred embodiment of my invention, the numeral 5 designates a tray, shown as circular, for the purpose of illustration, although it may be formed in any other suitable shape. This tray is provided with an upstanding rim 6. The numerals 7 and 8 designate an annular group of cup shaped holders, and 9 a centrally arranged cup shaped holder disposed within the annular group. All of these cup shaped holders are rigidly and permanently attached to the tray, and are adapted to receive paper cups, drinking glasses or the like. The bottoms of the cup shaped holders 7 are closed, while tapered cone receiving tubes 10 are attached to the tray 5, are arranged beneath the tray and lead into the bottoms of the cup shaped holders 8. The tubes and holder 8 are, therefore, adapted to receive and hold either paper cups or drinking glasses, or ice cream cones. The tapered tubes 10 also function as legs for the tray, to support the same when placed upon the table or the like, as will be explained. The bottoms of the holders 7 and 8 are provided with upstanding annular stiffening ribs 7', providing annular depressions 8'. The tapered tubes 10 are preferably formed integral with the rib 7'. In connection with the holder 8, the depression 8' serves to catch the melted ice cream, which may run down the cone, preventing the same from passing into and through the tapered tube 10. The holders 7 and 8 may be soldered or otherwise permanently attached to the tray.

The numeral 20 designates combined legs and clamps, which are attached to the lower surface of the tray and disposed opposite the circular group of tapered tubes 10, as shown. Each leg is preferably formed of a section of metal bent to provide a vertical portion 21 and a horizontal portion 22, carrying a depending vertical portion 23. The portions 22 and 23 produce an inverted L-shaped element. At its lower end, the portion 23 is bent into a horizontal foot 24 and the portions 22 and 23 are covered by rubber 25, as shown.

Disposed opposite the combined clamps and legs 21 is an adjustable brace-lever 26, comprising spaced sides 27. At its free end, this brace-lever is bent into a curved foot 28, covered by a section of rubber 29, or the like. The numeral 30 designates a stationary segment, formed integral with ears 31, rigidly attached to the bottom of the tray. The sides 27 are disposed upon opposite sides of the segment 30 and are pivoted thereto, at 32. The segment 30 is provided with ratchet teeth 33, adapted to be engaged by a pawl 34, disposed between the sides 27 and pivoted thereto, as shown at 35. This pawl is provided with an extension or tail 36, extending laterally upon the same side of the pivot 35, with the pawl, and this extension or tail is shifted outwardly by means of a leaf-spring 37. The extension 36 is disposed longitudinally of the lever 26 and projects laterally beyond the same, and may be readily depressed by the index finger, to free the pawl 34 from engagement with the ratchet teeth 33.

When the brace-lever 26 is shifted to the upper horizontal position, it folds beneath the tray and is positioned above the lower ends of the tapered tubes 10 and the combined legs and clamps 25, and hence is out of the way and will not contact with the table. The tapered tubes 10 and elements 21 now function as legs for the tray. Paper cups or glasses may be positioned within any or all of the cup shaped holders, and the tray may be brought to the positions so that syrup, carbonated water or the like may be supplied into the glasses, without the necessity of the operator touching the same. Ice cream cones may be inserted within the combined glass and cone holders. With the cup shaped holders properly filled, the tray is brought in proximity to the automobile, and while being held by the left hand, the waiter may grasp the brace-lever 26 with the right hand and place the index finger upon the pawl extension 36, depressing the pawl extension to thereby free the pawl and then swing the brace-lever to the vertical position. The inverted L-shaped elements 21 are now placed over the edge of the door or the door glass of the automobile and the brace-lever 26 swung inwardly until it engages the door with the tray positioned horizontally. The brace-lever is locked by the pawl and ratchet teeth in this adjusted position, and the tray supported in a horizontal position. Without further adjustment of the brace-lever the tray may be readily lifted off of the door. I contemplate using the tray without the cup shaped holders. The tray and associated elements may be formed of metal, such as aluminum, or any other suitable material which may be readily washed or sterilized.

It is to be understood that the form of my invention, herewith shown and described, is to be taken as a preferred example of the same, and that various changes in the shape, size and arrangement of parts, may be resorted to without departing from the spirit of my invention, or the scope of the subjoined claims.

Having thus described my invention, I claim:—

1. A curb service tray, comprising a tray element, clamp means carried by the tray element to engage one side of the upstanding portion of an automobile or the like, a toothed segment arranged beneath and attached to the tray element, a lever having one end pivotally connected with the toothed segment so that its free end may be swung toward and away from the clamp means, such free end being adapted for engagement with the opposite side of said upstanding portion of the automobile, said lever being rigid throughout its length from its free end to its point of pivotal connection with the segment, and a pawl pivotally mounted upon the lever and arranged to engage with the toothed segment, said pawl having pivotal movement with relation to the free end portion of the lever.

2. A curb service tray, comprising a tray element, clamp means carried by the tray element to engage one side of the upstanding portion of an automobile or the like, a segment attached to the tray and arranged opposite the clamp means and provided with ratchet teeth, a lever having one end pivotally mounted upon the segment so that its opposite free end may be swung toward and away from the clamp means, said lever being rigid throughout its length from its free end to its point of pivotal connection with the segment, and a spring-pressed dog pivotally mounted upon the lever and arranged to engage with the ratchet teeth of the segment, the arrangement being such that the free end of the lever is adapted to be moved into engagement with the opposite side of said upstanding portion of the automobile and the dog will trip over the ratchet teeth when the lever is moving toward said upstanding portion, the dog and ratchet teeth automatically locking the lever against swinging movement from said upstanding portion.

3. A curb service tray, clamp means carried by the tray and depending therefrom for engagement with one side of the upstanding portion of an automobile, a lever arranged beneath the tray and having one end thereof pivotally connected with the tray so that its opposite end may be swung toward and away from said clamp means, said opposite end being adapted to engage with the opposite side of said upstanding support, said lever being rigid throughout its entire length from its free end to its point of pivotal connection with said tray, a toothed segment arranged beneath the tray and attached thereto and disposed adjacent to said lever, and a pawl pivotally mounted upon the lever to engage with the toothed segment, said pawl having pivotal movement with relation to the free end of said lever.

4. A curb service tray, comprising a tray element, clamp means carried by the tray and depending below the same to engage with one side of the upstanding portion of an automobile, a segment depending from the tray and attached thereto and having ratchet teeth facing toward the clamp means, a lever embodying spaced sides and a closed edge which is disposed next to the clamp means, the opposite edge of the lever being open and arranged remote from said clamp means, said sides being arranged upon opposite sides of said segment and pivoted thereto near their ends, the arrangement being such that the free end of the lever may be swung toward and away from said clamp means, said free end being adapted to engage with the opposite side of said upstanding portion of the automobile, said lever being rigid throughout its length between its free end and its point of pivotal connection with the segment, and a pawl pivotally mounted between the sides of said lever and arranged to engage the ratchet teeth, said pawl having a tail projecting laterally through and beyond the open edge of the lever, the arrangement of the pawl and ratchet teeth being such that they permit of the free swinging movement of the free end of the lever toward the clamp means, but lock the lever against swinging movement in an opposite direction.

In testimony whereof I affix my signature.

JOHN W. STRICKLAND.